United States Patent Office.

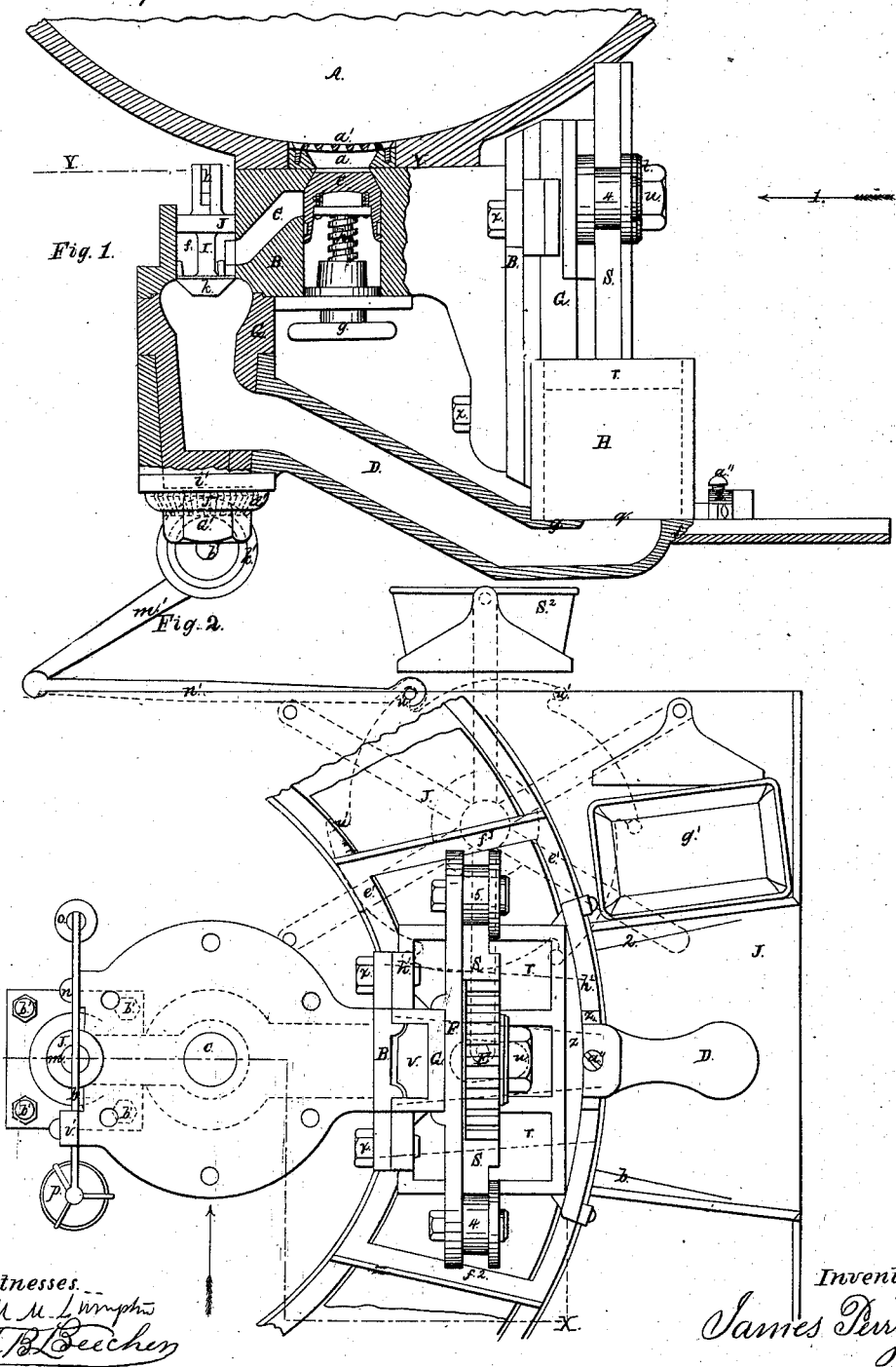

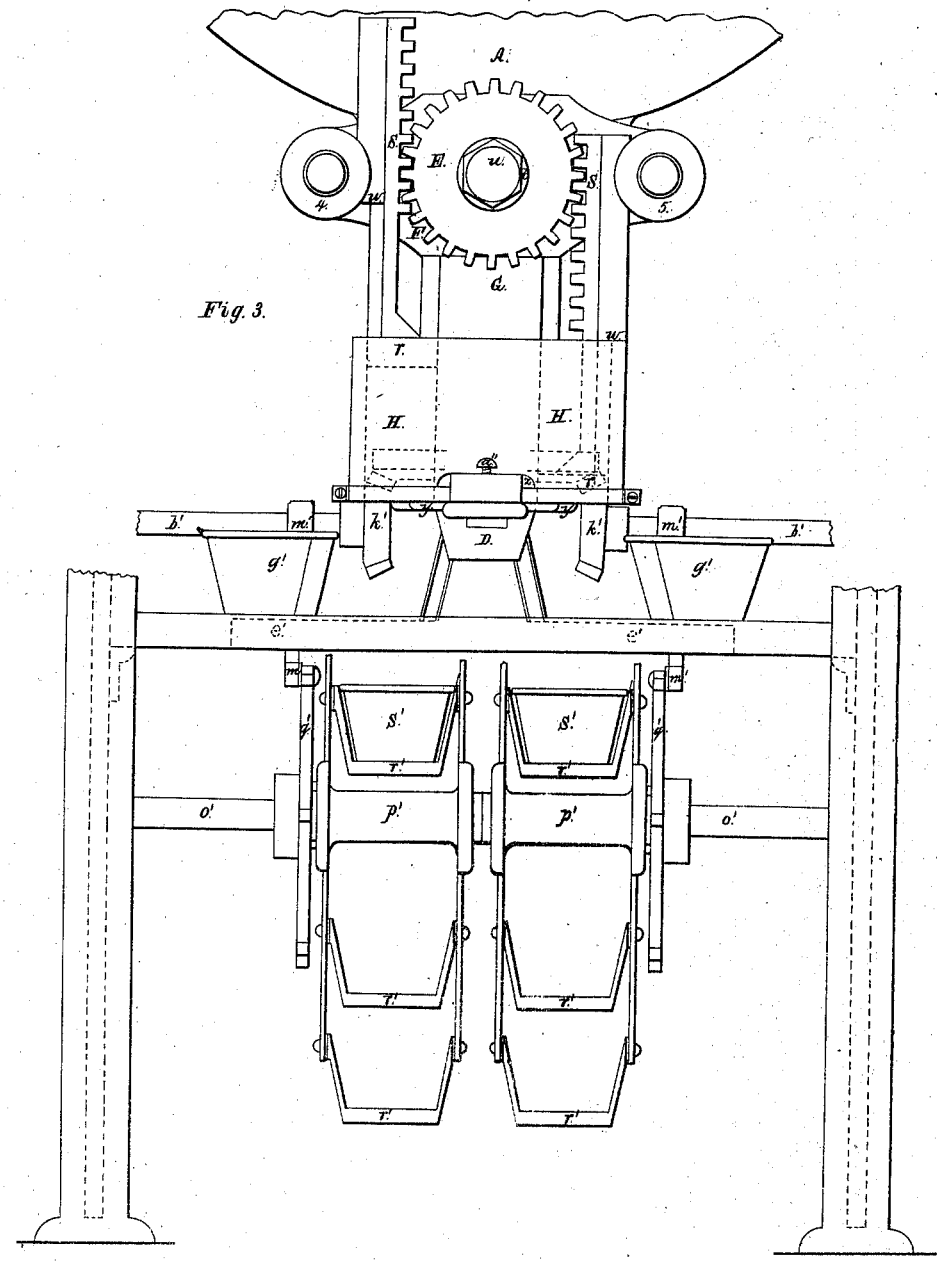

JAMES PERRY, OF BROOKLYN, NEW YORK.

*Letters Patent No. 78,232, dated May 26, 1868.*

IMPROVEMENT IN APPARATUS FOR APPORTIONING, EXPANDING, AND SHAPING DOUGH FOR THE MANUFACTURE OF BREAD.

*The Schedule referred to in these Letters Patent and making part of the same.*

TO ALL WHOM IT MAY CONCERN:

Be it known that I, JAMES PERRY, of the city of Brooklyn, in the county of Kings, and State of New York, have invented a new and improved Apparatus for Apportioning, Expanding, and Shaping Dough in the Process of Making Bread, Rolls, Cake, &c.; and I do hereby declare that the following is a full, clear, and exact description of the same, reference being had to the annexed drawing, which forms part of this specification.

The apparatus which forms the subject of my present invention is especially designed for use in the manufacture of bread which is prepared under pressure of gas.

The object of this invention is to obtain simple, inexpensive, and effective mechanism for regulating the expansion of dough, prepared under such pressure, and dividing the same into separate portions to form loaves, rolls, cakes, &c.

In order to give a better understanding of the advantages resulting from the use of my present invention, over such apparatus as is now in use for the same purpose, I will state that at present much embarrassment and difficulty are constantly met with in the manufacture of bread, &c., the dough for which is prepared and discharged under pressure, and, among others, for the following reasons: First, it is found in practice that the dough, after having been charged with gas in the kneader, while being discharged through the dough-cocks now in use, loses much of the gas it contains as it enters the atmosphere, and as the dough must be drawn out rapidly to fill the oven in due time, it must necessarily be subjected to great pressure, from one hundred and fifty to one hundred and eighty pounds to the square inch, to insure sufficient levity to the bread. Second, this rapid discharge of the dough deranges the structure and texture of the loaves, and consequently deteriorates the quality of the bread. Third, it is not possible by the apparatus now in use to apportion the quantity for each loaf of any given price equally, the variation often amounting to between two and three ounces per loaf. Fourth, the waste of gas and expense of keeping up such a high pressure in the kneader, in consequence of the strain, leakage, &c., are very considerable, the closest attention and most perfect construction of the machinery being required.

My invention obviates all these difficulties. The dough is prepared in a closed vessel, the same as now practised, but a pressure of about sixty pounds to the square inch will suffice, and I am enabled to form enough of this dough into loaves of equal weight to fill an oven in about fifteen minutes without losing any of the gas it contains, or, at any rate, but the smallest possible quantity. To effect such results, the pressure upon the dough in the kneader must be diminished before it comes in contact with the atmosphere, to prevent the sudden rupture of the loaf, roll, &c. The requisite quantity of dough for each loaf, roll, &c., must also be separated from the mass in the kneader before it enters the baking-pans or other receptacle. The dough in passing out must not be allowed to enter a partial vacuum, or any considerable space in the apparatus not already filled with dough of corresponding pressure, else the gas will escape from it; nor must the dough, once expanded to a given degree, be subjected to a greater external pressure, as this is detrimental to the quality and levity of the bread.

The nature of my invention consists in the combination, with a kneader in which dough is prepared under pressure of gas, of a valve so arranged that the dough may be delivered into the atmosphere with such diminished pressure as shall not exceed the tenacity of the dough, thereby preventing the rupture of the dough.

It also consists in a valve of an improved construction.

It also consists in the combination, with a kneader, of a perforated plate or strainer for preventing lumps of unmixed dough or other hard substances entering the valve-chamber.

It also consists in the combination of a hollow arm or dough-conductor with one or more chambers and pistons for apportioning and shaping the dough.

It also consists in the combination of a movable cross-head, or its equivalent, with mechanism for operating the same, whereby the capacity of the chambers may be increased or diminished.

It also consists in the employment and arrangement of devices for bringing the pans under and away from the chambers to be filled with dough and discharged.

In the accompanying drawing—

Figure 1 is a vertical transverse section, taken on the plane of the line $x$ $x$, fig. 2.

Figure 2 is a plan or top view, the kneader having been removed on the plane of the line $y$ $y$, fig. 1.

Figure 3 is a front view looking in the direction of the red arrow 1, fig. 1.

Similar letters of reference indicate corresponding parts in the three figures.

A designates the lower portion of a kneader or closed vessel, in which the dough is prepared under pressure of gas for the manufacture of aerated bread. This kneader or closed vessel may be of the ordinary spherical form, or of any other suitable construction. Emanating from the lower part of this kneader is a pipe or passage-way, $a$, between the upper part of which and the kneader is a perforated plate or strainer, $a'$, to prevent any lumps of unmixed dough or other hard substance passing through to interfere with the proper working of the other parts of the machinery. This strainer may be made separate from and secured to the bottom of the kneader, or it may be secured to the casting below the kneader. A passage-way or pipe, $e$, emanates from this pipe or passage-way, $a$, leading to a valve-chamber, $f$. The flow of the dough from the kneader to the chamber $f$ is cut off by a valve, $c$, which, in the present instance, is operated by a wheel, $g$, and screw $h$, as shown clearly in fig. 1.

I is a double-headed valve, $k$ being the lower head, whose face is ground evenly to fit against a seat at the bottom of the chamber $f$, and J being the upper head, which is ground to fit air-tight in the chamber $f$. To the valve I there is connected a balance-lever, $b$, (see fig. 2,) by a pin, $m$, the fulcrum being at $n$, and the weight $o$ being just sufficient to balance the lever $b$, valve I, and weight-pan $p$. Under the lever $b$, and in the cup or box $v'$, an adjusting-screw or other device is placed to regulate the distance which the valve I may move.

D is a tube or hollow arm, its upper end being provided with a socket, which is fitted upon a hollow spindle, C, so as to turn laterally thereon, and the arm is held upon the spindle by a bolt, $c'$, and washer $d'$, as shown in fig. 1. Communication between the said spindle and the arm is effected by corresponding openings in each, and thus a direct passage-way from the chamber $f$ through the arm D is insured.

H H are the chambers for apportioning the quantity of dough to be let into the pans $g$ $g$. These chambers may be of any desired size and shape. Into said chambers pistons $r$ $r$ are fitted to work. S S are two bars, arranged to slide vertically, being guided by friction-rollers 4 5. These bars are provided with racks, into which meshes a gear-wheel, E, which revolves upon a bushing, $t$. Through this bushing and through the cross-head F, as well as through a slot cut longitudinally in the casting G, a bolt, $u$, passes, and enters a nut, sliding in a groove on the inner side of the casting G. By screwing up this nut the said cross-head is held at any required distance from the bottom plane of the chambers H H, for the purpose of apportioning the quantity of the dough that may be required for the particular size of the loaves that are to be made; as, for instance, by lowering the cross-head F, the pistons must move a less distance in the chambers, hence leaving a smaller space to be filled with dough when the arm D is brought under either chamber H, so as to open into it.

The bars S S are prevented descending below the bottom plane of the chambers H H by the projections $w$ $w$ on the said bars, which, at the completion of each descent, rest on the tops of the side walls of the chambers H H, as will be understood by reference to fig. 3.

For the convenience of adjustment, the casting G, to which the sides of the piston-chambers are firmly secured, is fitted so as to slide upon a portion of the casting B, to which it is secured, in the present instance, by bolts $x$ $x$, so that it can be adjusted so as to cause the ground bottom-walls of the chambers H H to fit closely to the ground face of the shearing-plate $y$, which plate is secured to or formed with the arm D.

In order to hold the ground lower faces of the walls of the chamber H H closely to the face of the shearing-plate $y$, I have shown a segment or circular arch, $z'$, secured to the chambers H H, which is properly fitted to allow the gib $z$, secured to a projection on the arm D, to be tightened by a set-screw, $a''$.

I have shown the spindle C as secured to the casting B by four bolts, $b'$ $b'$ $b'$ $b'$, (see fig. 2,) but any other proper form of fastening these parts together may be adopted.

To the bottom of the arm D two circular arcs $e'$ $e'$, of different radii, are secured, and their ends are connected by the bevel ties $f^1$ $f^2$, which are made to fit the sides of the pan $g'$. Between the arcs $e'$ $e'$ a portion of the table J rises a little above the arcs, and when the centre of the arm D is in the position of the diverging line 2, (see fig. 2,) the pan $g'$ is to be shoved forward upon the circular section of the table which lies between the arcs $e'$ $e'$. In the movement of the arm D from the diverging line 2 to that 3, the tie $f^1$ moves the pan under the piston-chamber on that side in time to receive the loaf, which is forced out by the ascent of the opposite piston, and on the return of the arm D to the line 2, the replenished pan is moved out so as to stand in line of the next pan, now in the same position as indicated by the pan $g'$, which in its turn is moved upon the arc of the table, shoving the replenished pan beyond the circular section of the table before the return of the tie $f^1$ from its greatest point of vibration.

The centre line of the pan is directly under the outside edge of the piston-chamber, when the cutting-edge of the shearing-plate $h'$ $h'$ (shown in dotted lines in fig. 2) passes the former, which allows the loaf to lie evenly in the pan, and at the same instant the port $q$ begins to open into the piston-chamber, toward which it is moving. The same relations of the movements and operations occur at each alternate motion of the arm D, under and from and to the other piston-chamber.

To insure an automatic movement of the pans, I have illustrated, in red outline in figs. 1 and 3, the following mechanism: The socket of the arm D is provided with two projecting circular segments $i'$, (only one is shown in fig. 1,) to each of which a segment of bevel-gear, J', is attached, which meshes into a pinion, $k'$, to which the shaft $b'$, lever $m'$, and ratchet-rod $n'$ are connected. On the horizontal shaft $p'$, which lies in the vertical plane passing through the centres of the pistons, two pan-wheels $p'$ $p'$ revolve, having each a ratchet, $q'$ $q'$, and six pan-holders $r'$ $r'$ $r'$ $r'$ $r'$ $r'$, attached, into which the pans $s^1$ $s^1$ $s^1$ $s^2$ are placed, which are to receive the loaves as they drop from the piston-chambers H H.

At each vibration of the arm D, one of the ratchet-rods, $n'$, moves its pan-wheel, and thus places a pan under its corresponding chamber H, as shown at $s^2$, fig. 1, while the other moves forward in its turn to catch hold of its ratchet-tooth $u'$, for the purpose of performing a similar operation for the other piston and its chambers.

The horizontal position which the pans retain in the pan-holders at all stages of the revolution of the pan-wheels, and the positive motion which they are subject to, and the number of convenient positions to remove the replenished and replace the empty pans, are evidences of the admirable adaptation of this arrangement for its specific purpose.

It would be well to have the holes in the strainer not less than the area of the cross-section of the passage $e$, and to have the smaller diameter of each hole a little less than the distance the disk $k$ of the valve I recedes from its seat, so that hard lumps passing through the holes in the strainer can also pass out of the valve-chamber.

With these provisions and adjustments the desired pressure in the arm D and piston-chambers is obtained; which cannot be exceeded unless the weight in the pan $p$ is increased, as the valve I completely closes the passage from $e$ to D, when the desired pressure is obtained in the chambers H H and arm D.

It is obvious that any other shaped pistons, and a greater number of them, may be worked and supplied with dough, with the same or a similar arm to D, and that the principles of construction and operation herein described may be applied in various ways; and the custom of the trade requires that the baked products shall be of various shapes, of which the round, oblong, rectangular, elliptic, and concentric forms are common, and these may be made by giving the chambers and pistons such shapes, and providing some of them with concentric or interior shafts, upon which the pistons fit and slide to produce such marked products; therefore, I do not confine myself to any particular form or number of chambers or pistons.

It is furthermore obvious that the valve I and its appendages can be associated with the common stop-cock and spouts, to obviate the tediousness and incidental difficulties pertaining to the present use of these devices for drawing out the dough and forming the loaves, &c., therefrom, but the combination of any of these is too simple and easily understood to require a detailed description of such parts to show their connection with the said valve I, as, for instance, I would state that a chamber may be formed below the valve I, and in this a stop-cock inserted to draw off the dough.

Having thus described my invention, what I claim as new, and desire to secure by Letters Patent, is—

1. The combination, with a kneader, A, of the valve I and its chamber, substantially as herein specified, whereby the expansion of dough, prepared under pressure of gas, can be regulated as desired.

2. I claim the double-head valve I, constructed and operating substantially as herein specified.

3. The combination, with the kneader A, of the perforated plate or strainer $a'$, substantially as herein specified, for preventing lumps of unmixed dough or other hard substances impeding the perfect operation of the valve I.

4. The combination of the hollow arm D with one or more chambers and pistons, substantially as herein specified, whereby the dough may be apportioned and shaped as desired.

5. The movable cross-head F, in combination with the wheel E and rack-bars S S, substantially as described, whereby the capacity of the chambers H H may be increased or diminished, as desired.

6. The combination, with the valve I, of the balance-lever $b$ and its appendages, substantially as and for the purpose herein specified.

7. The combination, with the arm D and table J, of the arcs $e'$ $e'$, substantially as specified, whereby the pans are brought under and away from the chambers H H, for filling and discharging them.

JAMES PERRY.

Witnesses:
M. M. LIVINGSTON,
SOLON C. KEMON.